Patented July 24, 1928.

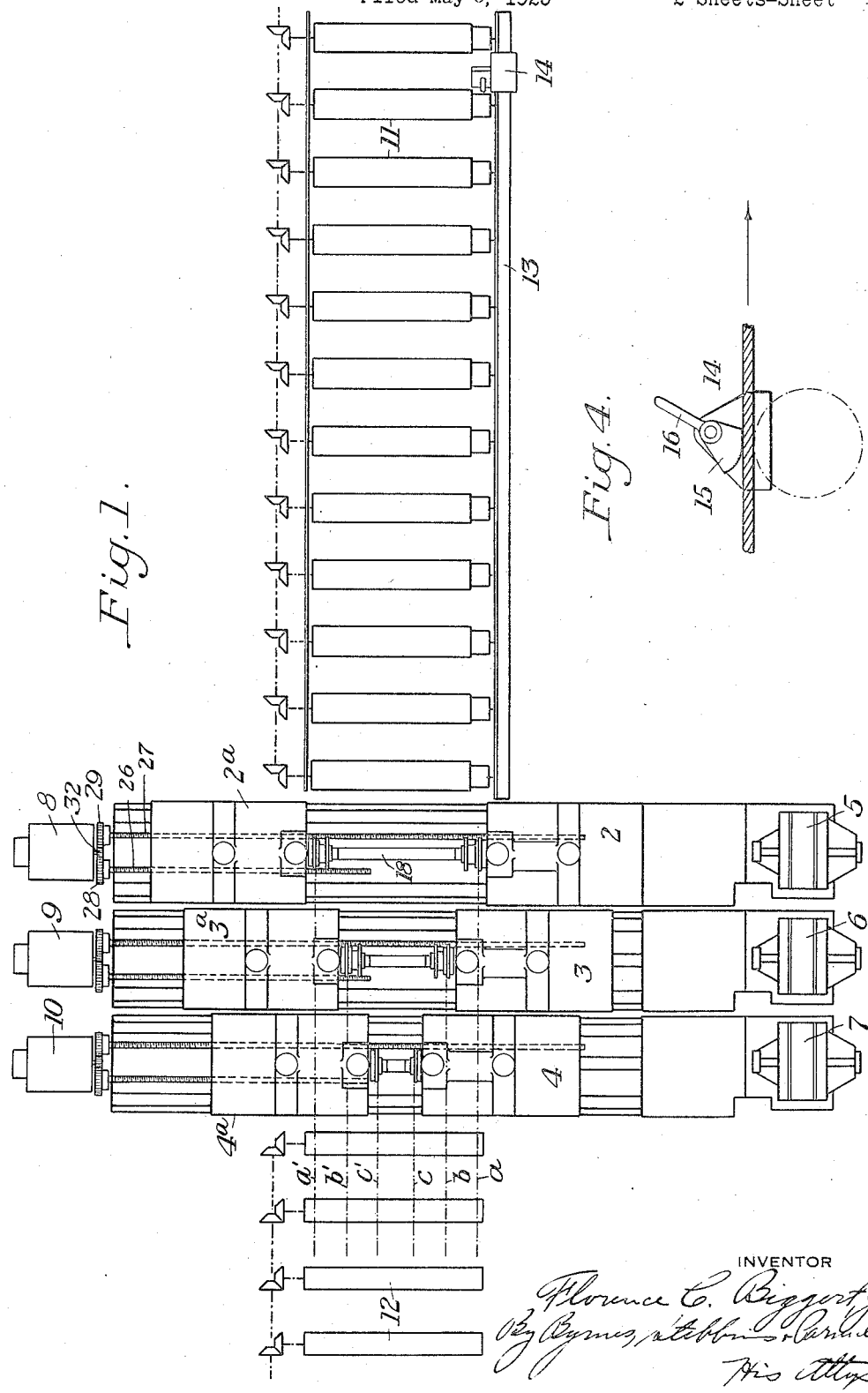

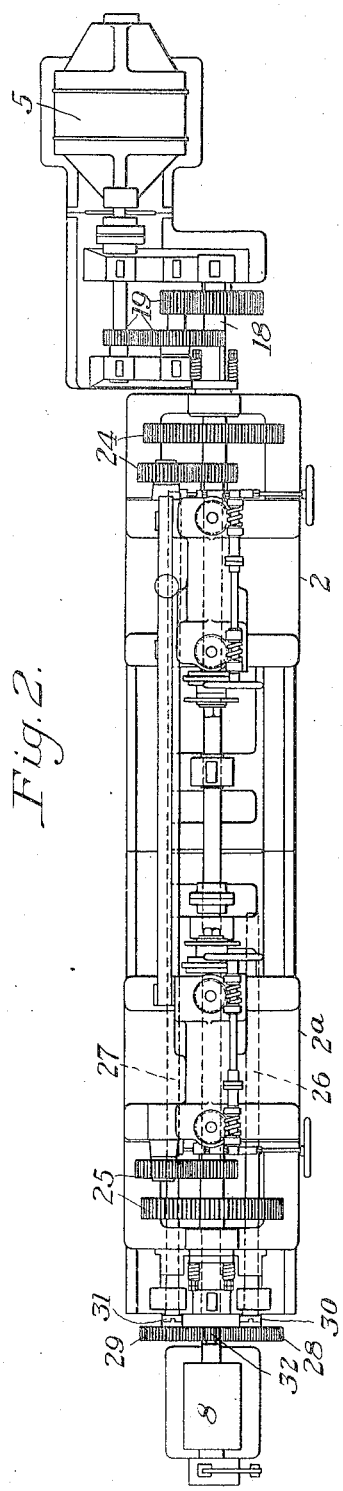
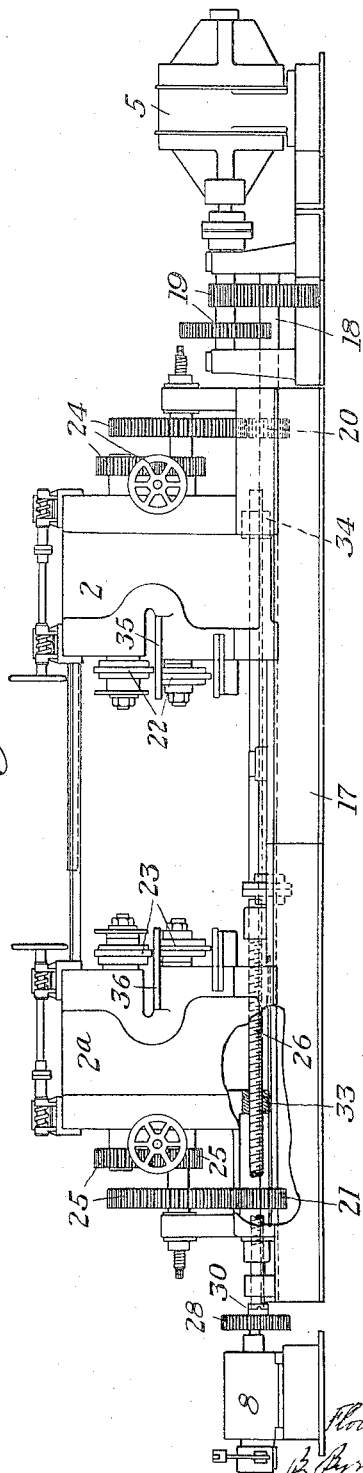

1,678,458

UNITED STATES PATENT OFFICE.

FLORENCE C. BIGGERT, JR., OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

MULTIPLE SHEARS.

Application filed May 6, 1925. Serial No. 28,467.

The present invention relates to rotary shears and more particularly to a multiple arrangement of rotary shears adapted to trim the edges of sheets or plates and divide the same into a plurality of strips of any desired width.

In the accompanying drawings—

Figure 1 is a plan view, more or less diagrammatic, illustrating a preferred embodiment of my invention;

Figures 2 and 3 are respectively a plan view and a side elevation of a pair of the shears shown in Figure 1; and Figure 4 is a detail view of a clamp.

Referring to Figure 1, there is shown therein a plurality of pairs of rotary shears 2, $2^a$, 3, $3^a$, and 4, $4^a$, the shears 2, 3 and 4 having motors 5, 6 and 7 associated therewith for operating all of the shears, and the shears $2^a$, $3^a$ and $4^a$ having motors 8, 9 and 10 associated therewith for moving the shears of the several pairs towards or from each other. Roller tables 11 and 12 are shown for feeding the sheets or plates to the shears and for moving the strips away from the shears. Extending along one side of the roller table 11 is a guide angle 13 on which there is mounted to slide a clamp 14. This clamp comprises an eccentric clamping member 15 adapted to be operated by a handle 16. In feeding a sheet to the shears, the sheet is moved over the roller table 11 until its forward end is adjacent the first pair of shears 2 and $2^a$ and then the clamping member 15 is thrown into engagement with the sheet with the clamp 14 positioned at the rear end of he angle 13, as shown in Figure 1. It will be seen that as the roller table moves the sheet through the shears, the clamp 14 will slide along the angle 13 and cause the sheet to move in a rectilinear path through the shears. When the clamp 14 approaches the first pair of shears, the handle 16 is adapted to strike against a portion of the shear housing and automatically release the clamped sheet.

Each pair of shears is exactly alike in construction and operation so that a description of shears 2 and $2^a$ and the means of operating and moving them towards or from each other will suffice.

Referring to Figures 2 and 3, the shears 2 and $2^a$ are mounted for sliding movement towards or from each other on a base 17. Journaled in suitable bearings in the base is a main drive shaft 18 which is adapted to be driven by the electric motor 5 through the gear train 19. Splined on the shaft 18 are pinions 20 and 21 adapted to operate the rotary cutters 22 and 23 of the shears 2 and $2^a$ through gear trains 24 and 25.

Journaled in the base 17 are screws 26 and 27 adapted to be operatively connected with gears 28 and 29 by clutches 30 and 31. The gears 28 and 29 are adapted to be driven by the motor 8 through the pinion 32. The screw 26 is engaged by a nut 33 integral with the housing of the shear $2^a$ and the screw 27 is engaged by a nut 34 integral with the housing of the shear 2. It will be seen that by connecting the screw 27 to the motor 8 through the clutch 31 the shear 2 can be moved towards or from the shear $2^a$ and that by operatively connecting the screw 26 to the motor 8 through the clutch 30 the shear $2^a$ can be moved towards or from the shear 2. The shears 2 and $2^a$ have work supports 35 and 36 upon which the edge portions of the sheet are adapted to slide as the sheet passes through the shears.

In using this apparatus the shears 2 and $2^a$ will be relatively adjusted by means of the motor 8 so as to trim the desired amount of material from the opposite edges of the sheet along the lines $a$ and $a'$ (Figure 1). The shears 3 and $3^a$ and 4 and $4^a$ will be relatively adjusted by means of their motors 9 and 10 in order to sever the sheet into strips of the desired width along the lines $bb'$ and $cc'$. While I have shown three pairs of shears arranged side by side, it will be understood that any desired number of shears may be so arranged depending upon the number of strips into which it is desired to cut the material.

While I have shown and described a preferred embodiment of my invention, it will be understood that the invention is not limited to its illustrated embodiment, but that it may be otherwise embodied within the scope of the appended claims without departing from the spirit of the invention.

I claim:

1. In a multiple shear, a plurality of pairs of oppositely arranged shears positioned side by side, means associated with each pair of shears for operating said shears, means associated with each pair of shears for relatively moving said shears towards or from each other, means for feeding the material through the shears, a guide associated with said feeding means, and a clamp slidable on said guide and engageable with the material for holding the same for movement in a rectilinear path through the shears, substantially as described.

2. In a multiple shear, a plurality of pairs of shears positioned side by side so as to simultaneously engage material, a feed table arranged to carry material to the shears, each pair of shears being relatively stationary with respect to another pair of shears, the shears in each pair being relatively movable, and means for substantially simultaneously adjusting the shears in a pair toward or away from the center line of the material.

3. In a multiple shear, a plurality of pairs of shears positioned side by side so as to simultaneously engage material, and means for feeding material to the shears, the several pairs of shears being so arranged as to shear on lines successively closer to the center line of the material.

4. In a multiple shear, a plurality of pairs of stationary shears positioned side by side so as to simultaneously engage material, and means for feeding sheet material successively to the several pairs of shears, the shears in the several pairs being arranged successively closer together in the order in which they engage the fed material.

In testimony whereof I have hereunto set my hand.

FLORENCE C. BIGGERT, Jr.